(12) United States Patent
Saruwatari et al.

(10) Patent No.: US 11,161,195 B2
(45) Date of Patent: *Nov. 2, 2021

(54) NI-BASED ALLOY WIRE FOR SUBMERGED ARC WELDING AND METHOD OF MANUFACTURING WELDING JOINT

(71) Applicant: NIPPON STEEL CORPORATION, Tokyo (JP)

(72) Inventors: Suo Saruwatari, Tokyo (JP); Takashi Namekata, Futtsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 236 days.

This patent is subject to a terminal disclaimer.

(21) Appl. No.: 16/465,064

(22) PCT Filed: Mar. 27, 2018

(86) PCT No.: PCT/JP2018/012462
§ 371 (c)(1),
(2) Date: May 29, 2019

(87) PCT Pub. No.: WO2019/186701
PCT Pub. Date: Oct. 3, 2019

(65) Prior Publication Data
US 2020/0238423 A1 Jul. 30, 2020

(51) Int. Cl.
*B32B 15/00* (2006.01)
*B23K 9/18* (2006.01)
(Continued)

(52) U.S. Cl.
CPC .......... *B23K 9/186* (2013.01); *B23K 35/3033* (2013.01); *C22C 19/03* (2013.01); *B23K 2101/12* (2018.08)

(58) Field of Classification Search
None
See application file for complete search history.

(56) References Cited

U.S. PATENT DOCUMENTS

2007/0215586 A1* 9/2007 Graillat ................ C22C 19/057
219/137 WM
2012/0276384 A1 11/2012 Kawamoto et al.
(Continued)

FOREIGN PATENT DOCUMENTS

CN 101128273 A 2/2000
CN 1843683 A 10/2006
(Continued)

OTHER PUBLICATIONS

Chinese Office Action dated Mar. 3, 2020, issued in Chinese Patent Application No. 201880004619.6.
(Continued)

*Primary Examiner* — Seth Dumbris
(74) *Attorney, Agent, or Firm* — Birch, Stewart, Kolasch & Birch, LLP (57) ABSTRACT

A Ni-based alloy wire for submerged arc welding according to an aspect of the present invention includes, as a chemical composition, by mass %, C: 0.001% to 0.060%, Si: 0.01% to 3.00%, Mn: 0.01% to 6.00%, Mo: 15.0% to 25.0%, W: 2.5% to 10.0%, Ta: 0.002% to 0.100%, Ni: 65.0% to 82.4%, Al: 0% to 2.00%, Ti: 0% to 2.00%, Cu: 0% to 1.0%, P: 0% to 0.0200%, S: 0% to 0.0200%, N: 0% to 0.1000%, O: 0% to 0.0100%, Fe: 0% to 10.0000%, Co: 0% to 0.1000%, Cr: 0% to 1.0000%, V: 0% to 0.1000%, Nb: 0% to 0.1000%, B: 0% to 0.0100%, Bi: 0% to 0.0100%, Ca: 0% to 0.0200%, REM: 0% to 0.0300%, Zr: 0% to 0.1000%, and a remainder: impurities; in which a value X is 0.010% to 0.180%.

16 Claims, 1 Drawing Sheet

(51) Int. Cl.
*B23K 35/30* (2006.01)
*C22C 19/03* (2006.01)
*B23K 101/12* (2006.01)

(56) References Cited

U.S. PATENT DOCUMENTS

| | | | | |
|---|---|---|---|---|
| 2014/0332517 | A1* | 11/2014 | Barhorst | B23K 35/0255 219/146.23 |
| 2015/0076130 | A1* | 3/2015 | Zhang | B23K 9/173 219/137 R |
| 2015/0217412 | A1* | 8/2015 | Liu | C22C 19/055 428/680 |
| 2019/0126408 | A1 | 5/2019 | Sagara et al. | |

FOREIGN PATENT DOCUMENTS

| | | |
|---|---|---|
| CN | 1993488 A | 7/2007 |
| CN | 101605628 A | 12/2009 |
| CN | 106048309 A | 12/2009 |
| CN | 102105260 A | 6/2011 |
| CN | 104722896 A | 6/2015 |
| CN | 107250417 A | 10/2017 |
| JP | 55-10322 A | 1/1980 |
| JP | 58-196192 A | 11/1983 |
| JP | 62-57796 A | 3/1987 |
| JP | 4-351290 A | 12/1992 |
| JP | 9-85486 A | 3/1997 |
| JP | 10-296486 A | 11/1998 |
| JP | 11-277292 A | 10/1999 |
| JP | 2000-263285 A | 9/2000 |
| JP | 2006-272432 A | 10/2006 |
| JP | 2009-39761 A | 2/2009 |
| JP | 2011-56562 A | 3/2011 |
| JP | 2012-115889 A | 6/2012 |
| JP | 5048167 B2 | 10/2012 |
| KR | 10-2011-0011563 A | 2/2011 |
| KR | 10-2013-0016331 A | 2/2013 |
| KR | 10-2016-0024778 A | 3/2016 |
| WO | WO 2017/171050 A | 10/2017 |

OTHER PUBLICATIONS

Korean Notice of Allowance for Korean Application No. 10-2019-7014684, dated Dec. 20, 2019, with English translation.
"Methods of bend test for butt welded joint", JIS Z 3122, 2013, total 57 pages.
"Methods of radiographic examination for welded joints in stainless steel", JIS Z 3106, 2001, total 87 pages.
"Methods of tension and impact tests for deposited metal", JIS Z 3111, 2005, total 40 pages.
"Nickel steel plates for pressure vessels for low temperature services", JIS G 3127, 2013, total 46 pages.
"Standard Specification for Pressure Vessel Plates, Alloy Steel, Quenched and Tempered 7, 8, and 9 % Nickel", ASTM A553/A553M-17, Nov. 2017, pp. 290-293.
"Standard Specification for Steel Plates for Pressure Vessels, Produced by Thermo-Mechanical Control Process (TMCP)", ASTM A841/A841M-13, Nov. 2013, total 10 pages.
"Submerged arc welding solid wires and fluxes for 9% nickel steel", JIS Z 3333, 1999 (2007), total 22 pages.
International Search Report for PCT/JP2018/012462 dated Jun. 26, 2018.
Written Opinion of the International Searching Authority for PCT/JP2018/012462 (PCT/ISA/237) dated Jun. 26, 2018.
Chinese Office Action and Search Report for Chinese Application No. 201880004752.1, dated Mar. 23, 2020, with partial English translation.
International Search Report for PCT/JP2018/012361 dated Jun. 26, 2018.
Japanese Office Action for Japanese Application No. 2018-541432, dated Sep. 11, 2018, with English translation.
Korean Notice of Allowance for Korean Application No. 10-2019-7015285, dated Sep. 5, 2019,with an English translation.
U.S. Notice of Allowance for U.S. Appl. No. 16/461,588, dated Dec. 30, 2020.
Written Opinion of the International Searching Authority for PCT/JP2018/012361 (PCT/ISA/237) dated Jun. 26, 2018.

* cited by examiner

NI-BASED ALLOY WIRE FOR SUBMERGED ARC WELDING AND METHOD OF MANUFACTURING WELDING JOINT

TECHNICAL FIELD OF THE INVENTION

The present invention relates to a Ni-based alloy wire for submerged arc welding and a method of manufacturing a welding joint.

RELATED ART

From the viewpoint of recent global environmental problems, demand for liquefied natural gas (hereinafter, LNG) as clean energy tends to progressively increase. As an inner tank material for LNG storage tanks, a cryogenic ferritic material, for example, a steel containing Ni of 6% to 7%, or a steel containing Ni of 9% has been applied.

In recent years, as LNG storage tanks are increased in size, design stress is being highly strengthened. Submerged arc welding (SAW) is widely used for welding of a steel for low temperature service, because a high-grade welding joint can be obtained with high efficiency. Fluxes for submerged arc welding which can be applied to lateral posture welding in addition to flat welding, horizontal fillet welding, and the like have been developed, and these fluxes are applied in building low-temperature liquid storage tanks, and the like.

A weld of a steel for low temperature service, such as a steel containing Ni of 5.5%, a steel containing Ni of 6% to 7%, and a steel containing Ni of 9 requires low temperature toughness in a welded state without any change (that is, a state where a weld after welding has not changed in the quality of the material due to heat treatment, peening, or the like). Therefore, a Ni-based alloy wire having a larger amount of Ni than a base material has been applied. In site fabrication, a submerged arc welding method is applied in flat posture welding, horizontal fillet welding, and the like. A coated arc welding method, a TIG welding method, and the like are applied in vertical posture welding. Moreover, recently, development of flux-cored wires for gas shield arc welding having high efficiency and excellent welding workability is in progress. However, in welding using such flux-cored wires for gas shield arc welding, cracking resistance properties cannot be sufficiently ensured. Therefore, in welding of a butt joint, the coated arc welding method is currently a main stream.

However, the coated arc welding method has low welding efficiency and has a problem of reduction in a construction period in site fabrication.

As a technology for solving this problem, Patent Document 1 proposes a flux for submerged arc welding of a steel for low temperature service, in which vertical posture welding can be performed in addition to flat welding, horizontal fillet welding, and lateral posture welding in the related art, and a welding method therefore, in welding of a steel containing Ni of 5.5%, a steel containing Ni of 6% to 7%, a steel containing Ni of 9%, and the like used as materials or the like for building low-temperature liquid storage tanks.

In addition, Patent Document 2 proposes a submerged arc welding method for a steel for low temperature service, in which a high-quality welding joint capable of realizing flat welding, horizontal fillet welding, and lateral and vertical posture welding, capable of achieving high tensile strength and toughness, having excellent ductility, and having no blowhole and no cracking defect can be obtained when performing submerged arc welding of a steel containing Ni of 5.5%, a steel containing Ni of 6% to 7%, a steel containing Ni of 9%, and the like used as materials or the like used for building low-temperature liquid storage tanks.

However, the toughness of a weld metal which can be ensured by the technologies disclosed in Patent Documents 1 and 2 is not sufficient. Moreover, it is extremely important that hot-cracking is suppressed in inner tank materials for LNG storage tanks which require high reliability. Hot-cracking is cracking generated within a high temperature range in a weld metal and a heat affected zone (HAZ). However, according to the technologies described above, hot-cracking cannot be sufficiently suppressed. Particularly, in steels containing Ni of 9% and the like, steels having higher strength (for example, yield strength: 620 MPa or more, and tensile strength: 750 MPa to 880 MPa) than the strength level in the related art (yield strength: 590 MPa or more, and tensile strength: 690 MPa to 830 MPa) have been developed. However, high-strengthening entails degradation of toughness or degradation of hot-cracking resistance properties. Therefore, in regard to welding materials, there have only been welding materials in the related art, having yield strength of 400 MPa or more and tensile strength of 690 MPa or more. There have been no submerged arc welding material which can achieve high strength (for example, yield strength: 435 MPa or more, and tensile strength: 720 MPa or more), high toughness (for example, $vE_{-196}$: 34 J or more), and excellent hot-cracking resistance properties for high strength steels. It is well known that yield strength (0.2% proof stress) of a welding material such as a steel containing Ni of 9% is less than the yield strength of a steel sheet.

PRIOR ART DOCUMENT

Patent Document

[Patent Document 1] Japanese Unexamined Patent Application, First Publication No. 2009-39761
[Patent Document 2] Japanese Unexamined Patent Application, First Publication No. 2011-56562

DISCLOSURE OF THE INVENTION

Problems to be Solved by the Invention

An object of the present invention is to provide a Ni-based alloy wire for submerged arc welding, from which a high-quality welding joint capable of being applied to flat welding, horizontal fillet welding, and lateral posture welding, having high tensile strength and toughness, having more excellent ductility, and suppressing generation of blowholes and hot-cracking can be obtained, and a method of manufacturing a welding joint.

Means for Solving the Problem

The gist of the present invention is as follows.
(1) According to an aspect of the present invention, there is provided a Ni-based alloy wire for submerged arc welding including, as a chemical composition, by mass %, C: 0.001% to 0.060%, Si: 0.01% to 3.00%, Mn: 0.01% to 6.00%, Mo: 15.0% to 25.0%, W: 2.5% to 10.0%, Ta: 0.002% to 0.100%, Ni: 65.0% to 82.4%, Al: 0% to 2.00%, Ti: 0% to 2.00%, Cu: 0% to 1.0%, P: 0.0200% or less, S: 0.0200% or less, N: 0% to 0.1000%, O: 0% to 0.0100%, Fe: 0% to 10.0000%, Co: 0% to 0.1000%, Cr: 0% to 1.0000%, V: 0% to 0.1000%, Nb: 0% to 0.1000%, B: 0% to 0.0100%, Bi: 0% to 0.0100%, Ca: 0% to 0.0200%, REM: 0% to 0.0300%, Zr:

0% to 0.1000%, and a remainder: impurities; in which a value X defined by following Expression 1 is 0.010% to 0.180%.

$$X = [Ta] + 10 \times [REM] \quad \text{(Expression 1)}$$

Here, symbols indicated in the Expression 1 are amounts of corresponding elements by mass %.

(2) In the Ni-based alloy wire for submerged arc welding according to (1), the value X may be 0.020% to 0.150%.

(3) In the Ni-based alloy wire for submerged arc welding according to (1) or (2), a total value of an Al content and a Ti content may be 0.01% to 4.00% by mass %.

(4) In the Ni-based alloy wire for submerged arc welding according to any one of (1) to (3), a diameter of the wire may be 1.2 mm to 6.4 mm.

(5) According to another aspect of the present invention, there is provided a method of manufacturing a welding joint including submerged arc welding a steel using the Ni-based alloy wire according to any one of (1) to (4) and a baked flux.

Effects of the Invention

According to the present invention, it is possible to provide a Ni-based alloy wire for submerged arc welding, from which a high-quality welding joint capable of being applied to flat welding, horizontal fillet welding, and lateral posture welding, having high tensile strength and toughness, having more excellent ductility, and suppressing generation of blowholes and a cracking defect can be obtained, and a method of manufacturing a welding joint.

EMBODIMENTS OF THE INVENTION

The inventors have examined a wire composition in which a weld metal having both high tensile strength and high toughness can be achieved and hot-cracking resistance properties can be enhanced. As a result, the inventors have found that an intermetallic compound is generated in a weld metal when a wire contains Ta, and further improvement of strength of a weld metal is realized due to precipitation strengthening caused by this intermetallic compound. In addition, the inventors have also found that Ta forms carbonitride during welding so that hot-cracking resistance properties of a weld metal are improved. Furthermore, the inventors have found that when a value X calculated based on Ta and REM is set within a predetermined range, both high strength and hot-cracking resistance properties can be further improved.

A composition of a Ni-based alloy wire for submerged arc welding according to an aspect of the present invention obtained from the foregoing knowledge will be described below. Unless otherwise noted, the unit "%" regarding the composition of a wire denotes mass %.

(C: 0.001% to 0.060%)

C enhances the tensile strength of a weld metal. In addition, C reacts with oxygen in an arc and becomes $CO_2$ gas, thereby having an effect of reducing the amount of oxygen in a weld metal. In the case where the C content is less than 0.001%, these effects cannot be sufficiently achieved, and tensile strength of a weld metal becomes insufficient. On the other hand, in the case where the C content exceeds 0.060%, toughness of a weld metal is significantly deteriorated. Therefore, the C content is set to 0.001% to 0.060%. A preferable lower limit value for the C content is 0.006%, 0.011%, or 0.016%. In addition, a preferable upper limit value for the C content is 0.054%, 0.049%, or 0.044%.

(Si: 0.01% to 3.00%)

Si improves strength of a weld metal and also improves toughness of a weld metal by further reducing the amount of oxygen in a weld metal. If the Si content less than 0.01%, the effects cannot be achieved. On the other hand, Si increases the solidification temperature range of a weld metal and is likely to cause hot-cracking by promoting generation of low-melting point inclusions such as P and S. Therefore, in the case where the Si content exceeds 3.00%, hot-cracking is likely to be generated. Therefore, the Si content is set to 0.01% to 3.00%. A preferable lower limit value for the Si content is 0.03%, 0.08%, or 0.13%. In addition, a preferable upper limit value for the Si content is 2.50%, 2.00%, 1.30%, or 0.90%.

(Mn: 0.01% to 6.00%)

Mn fixes S by forming MnS and enhances cracking resistance properties of a weld metal. In the case where the Mn content is less than 0.01%, this effect cannot be sufficiently achieved, and cracking resistance properties of a weld metal become insufficient. On the other hand, in the case where the Mn content exceeds 6.00%, a large amount of a Mn oxide is generated in a weld metal. This Mn oxide may become a fracture origin when bending stress is applied to a weld metal, so that the Mn oxide will deteriorate bending ductility of a weld metal. Therefore, the Mn content is set to 0.01% to 6.00%. A preferable lower limit value for the Mn content is 0.10%, 0.20%, 0.30%, or 0.40%. In addition, a preferable upper limit value for the Mn content is 5.00%, 4.00%, 3.00%, or 2.50%.

(Mo: 15.0% to 25.0%)

Mo is solid-solubilized in a weld metal and enhances the tensile strength of a weld metal. In the case where the Mo content is less than 15.0%, this effect cannot be sufficiently achieved, and tensile strength of a weld metal becomes insufficient. On the other hand, in the case where the Mo content exceeds 25.0%, elongation of a weld metal becomes insufficient. Therefore, the Mo content is set to 15.0% to 25.0%. A preferable lower limit value for the Mo content is 16.0%, 17.0%, 17.5%, or 18.0%. In addition, a preferable upper limit value for the Mo content is 23.0%, 21.0%, 20.0%, or 19.0%.

(W: 2.5% to 10.0%)

W is solid-solubilized in a weld metal and enhances the tensile strength of a weld metal. In the case where the W content is less than 2.5%, this effect cannot be sufficiently achieved, and tensile strength of a weld metal becomes insufficient. On the other hand, in the case where the W content exceeds 10.0%, elongation of a weld metal becomes insufficient. Therefore, the W content is set to 2.5% to 10.0%. A preferable lower limit value for the W content is 3.0%, 3.4%, 3.8%, or 4.2%. In addition, a preferable upper limit value for the W content is 9.0%, 8.0%, 7.0%, or 6.0%.

(Ta: 0.002% to 0.100%)

Ta is an extremely important element in the wire according to the present embodiment. It is assumed that Ta included in a wire generates a Ni—Mo—Ta based compound, a Ni—W—Ta based compound, and the like in a weld metal, and these compounds improve the tensile strength of a weld metal through precipitation strengthening. In addition, since Ta forms carbonitride having a high melting point, hot-cracking sensitivity is reduced. In order to achieve these effects, the Ta content needs to be 0.002% or more. On the other hand, in the case where the Ta content exceeds 0.100%, toughness is deteriorated. In addition, in this case, bending ductility is also deteriorated due to the high-strengthening. Therefore, the Ta content is set to 0.002% to 0.100%. A preferable lower limit value for the Ta content is 0.004%, 0.008%, 0.013%, 0.018%, or 0.022%. In addition, a preferable upper limit value for the Ta content is 0.080%, 0.070%, 0.060%, or 0.050%.

(Ni: 65.0% to 82.4%)

Ni is a main element of a weld metal and is an essential element for causing the structure of a weld metal to be an austenitic structure and ensuring the tensile strength and the toughness of a weld metal at a low temperature (for example, −196° C.). In consideration of dilution by a base material (a material to be welded), the Ni content of a wire needs to be 65.0% or more. The upper limit value for the Ni content is not particularly regulated. In consideration of the amounts of other alloying elements included in a wire, a substantial upper limit value for the Ni content is approximately 82.4%. Since Ni is an expensive element, the material cost can be reduced by reducing the Ni content. A preferable lower limit value for the Ni content is 65.0%, 66.0%, 67.5%, or 69.0%. A preferable upper limit value for the Ni content is 79.0%, 76.0%, 74.0%, or 71.0%.

In addition to the essential elements described above, the wire according to the present embodiment can optionally contain at least one selected from the group consisting of the elements described below. However, the wire according to the present embodiment can solve the problem even if optional elements are not included. Therefore, the lower limit value for each of the optional elements is 0%.

(Al: 0% to 2.00%)
(Ti: 0% to 2.00%)

Al and Ti have a deoxidation action and a denitration action and enhance the toughness and blowhole resistance properties of a weld metal. Therefore, the wire according to the present embodiment may contain one or both Al and Ti. On the other hand, in the case where the Al content exceeds 2.00% and/or the Ti content exceeds 2.00%, a large amount of an Al nitride and/or a Ti nitride is generated in a weld metal, and these nitrides will fracture origins when bending stress is applied to a weld metal, so that bending ductility and low temperature toughness of a weld metal are deteriorated. Therefore, the Al content is set to 0% to 2.00%, and the Ti content is set to 0% to 2.00%. It is not essential to contain Al, so that the lower limit therefor is 0%. A preferable lower limit value for the Al content is 0.01%, 0.04%, 0.08%, or 0.12%. In addition, a preferable upper limit value for the Al content is 1.50%, 1.20%, 0.90%, or 0.60%. It is not essential to contain Ti, so that the lower limit therefor is 0%. A preferable lower limit value for the Ti content is 0.03%, 0.06%, 0.09%, or 0.12%. In addition, a preferable upper limit value for the Ti content is 1.50%, 1.20%, 0.90%, or 0.60%.

In the case where both Al and Ti are present, if Al and Ti are combined, oxide is condensed and the oxide in a weld metal is more likely to float. Accordingly, toughness of a weld metal is improved. Therefore, it is preferable that the total value of the Al content and the Ti content is set to 0.01% or more. The lower limit for the total value of the Al content and the Ti content may be set to 0.05%, 0.10%, or 0.15%, and the upper limit therefor may be set to 4.00%, 3.00%, 2.00%, 1.50%, or 1.20%.

(Cu: 0% to 1.0%)

Cu improves electric conductivity of a wire and stabilizes a welding current in a case of being plated on the surface of a wire. Therefore, the wire according to the present embodiment may contain Cu. On the other hand, in the case where the Cu content exceeds 1.0%, low temperature toughness of a weld metal is deteriorated. Therefore, the Cu content is set to 0% to 1.0%. It is not essential to contain Cu, so that the lower limit therefor is 0%. A preferable lower limit value for the Cu content is 0.05%, 0.1%, or 0.2%. A preferable upper limit value for the Cu content is 0.6%, 0.4%, or 0.3%.

(P: 0.0200% or less)

P is an impurity element, which significantly deteriorates the toughness of a weld metal. Therefore, it is preferable that the amount thereof is reduced as much as possible, but P of 0.0200% or less is allowed. It is not essential to contain P, so that the lower limit therefor is 0%. In order to reduce the refining cost, the lower limit value for the P content may be set to 0.0010%, 0.0020%, or 0.0040%. In order to further improve the toughness of a weld metal, the upper limit value for the P content may be set to 0.0150%, 0.0100%, 0.0070%, or 0.0050%.

(S: 0.0200% or less)

S is an impurity element, which significantly deteriorates the toughness of a weld metal. Therefore, it is preferable that the amount thereof is reduced as much as possible, but S of 0.0200% or less is allowed. It is not essential to contain S, so that the lower limit therefor is 0%. In order to reduce the refining cost, a preferable lower limit value for the S content may be set to 0.0010%, 0.0020%, or 0.0030%. In order to further improve toughness of a weld metal, the upper limit value for the S content may be set to 0.0170%, 0.0140%, 0.0110%, or 0.0080%.

(N: 0% to 0.1000%)

N has effects of stabilizing austenite in a weld metal and improving the low temperature toughness. In addition, N also has an effect of enhancing the strength of a weld metal. Therefore, the wire according to the present embodiment may contain N. On the other hand, in the case where the N content exceeds 0.1000%, deterioration in toughness of a weld metal, an increase in the generation amount of blowholes, and the like are caused. Therefore, the N content is set to 0% to 0.1000%. It is not essential to contain N, so that the lower limit for the N content is 0%. There is no need to particularly regulate the lower limit value for the N content. However, 0.0001%, 0.0020%, 0.0050%, or 0.0100% may be set as the lower limit for the N content. A preferable upper limit value for the N content is 0.0800%, 0.0650%, or 0.0500%.

(O: 0% to 0.0100%)

O stabilizes an arc at the time of arc welding. Therefore, the wire according to the present embodiment may contain O. On the other hand, in the case where the O content exceeds 0.0100%, oxide is generated in a weld metal, so that toughness and fatigue strength of a weld metal become insufficient. Therefore, the O content is set to 0% to 0.0100%. It is not essential to contain O, so that the lower limit for the O content is 0%. There is no need to particularly regulate the lower limit value for the O content. However, 0.0001%, 0.0010%, 0.0020%, or 0.0030% may be set as the lower limit for the O content. A preferable upper limit value for the O content is 0.0080%, 0.0065%, or 0.0050%.

(Fe: 0% to 10.0000%)

There are cases where Fe is included as an impurity during a step of smelting a raw material of a wire. In addition, since Fe reduces the Ni content such that the material cost is reduced, there are cases where Fe is contained in a wire, in place of Ni. Fe of 10.0000% or less is allowed. It is not essential to contain Fe, so that the lower limit for the Fe content is 0%. There is no need to particularly regulate the lower limit value for the Fe content. However, 0.0010%, 0.0100%, 0.1000%, 0.5000%, or 1.0000% may be set as the lower limit for the Fe content. A preferable upper limit value for the Fe content is 9.0000%, 8.0000%, 7.0000%, or 6.0000%.

(Co: 0% to 0.1000%)

Co forms intermetallic compounds with Ni, Mo, W, and the like, thereby improving the tensile strength of a weld metal. Therefore, the wire according to the present embodiment may contain Co. On the other hand, in the case where the Co content exceeds 0.1000%, ductility of a weld metal is degraded, and toughness is impaired. Therefore, the Co content is to 0% to 0.1000%. It is not essential to contain Co, so that the lower limit for the Co content is 0%. There is no need to particularly regulate the lower limit value for the Co content. However, 0.0001%, 0.0100%, 0.0200%, or 0.0300% may be set as the lower limit for the Co content. A preferable upper limit value for the Co content is 0.0900%, 0.0800%, or 0.0700%.

(Cr: 0% to 1.0000%)

Cr is solid-solubilized in a weld metal and enhances the tensile strength of a weld metal. Therefore, the wire according to the present embodiment may contain Cr. On the other hand, in the case where the Cr content exceeds 1.0000%, the amount of oxygen in a weld metal increases, and low temperature toughness of a weld metal is deteriorated. Therefore, the Cr content is set to 0% to 1.0000% or less. It is not essential to contain Cr, so that the lower limit for the Cr content is 0%. There is no need to particularly regulate the lower limit value for the Cr content. However, 0.0001%, 0.0100%, 0.0500%, or 0.1000% may be set as the lower limit for the Cr content. A preferable upper limit value for the Cr content is 0.9000%, 0.8000%, or 0.7000%.

(V: 0% to 0.1000%)

V generates VC in a weld metal, and this VC causes precipitation strengthening, so that tensile strength of a weld metal is improved. Therefore, the wire according to the present embodiment may contain V. On the other hand, in the case where the V content exceeds 0.1000%, bending ductility and low temperature toughness of a weld metal are deteriorated. Therefore, the V content is to 0% to 0.1000%. It is not essential to contain V, so that the lower limit for the V content is 0%. There is no need to particularly regulate the lower limit value for the V content. However, 0.0001%, 0.0010%, 0.0070%, 0.0100%, or 0.0150% may be set as the lower limit for the V content. A preferable upper limit value for the V content is 0.0900%, 0.0800%, or 0.0700%.

(Nb: 0% to 0.1000%)

Nb generates NbC in a weld metal, and this NbC causes precipitation strengthening, so that tensile strength of a weld metal is improved. Therefore, the wire according to the present embodiment may contain Nb. On the other hand, in the case where the Nb content exceeds 0.1000%, Nb concentrated in the grain boundaries of a weld metal forms intermetallic compounds having a low melting point due to solidifying segregation, and these intermetallic compounds cause solidifying cracking, reheating liquefaction cracking, and the like at the time of welding. Moreover, in the case where the Nb content exceeds 0.1000%, carbide such as NbC is coarsened in a weld metal, and toughness of a weld metal is deteriorated. Therefore, the Nb content is set to 0% to 0.1000%. It is not essential to contain Nb, so that the lower limit for the Nb content is 0%. There is no need to particularly regulate the lower limit value for the Nb content. However, 0.0002%, 0.0020%, 0.0050%, 0.0100%, or 0.0200% may be set as the lower limit for the Nb content. A preferable upper limit value for the Nb content is 0.0900%, 0.0700%, 0.0600%, 0.0500%, or 0.0400%.

(B: 0% to 0.0100%)

B enhances the tensile strength of a weld metal by enhancing the hardenability of a weld metal. Therefore, the wire according to the present embodiment may contain B. On the other hand, in the case where the B content exceeds 0.0100%, bending ductility and low temperature toughness of a weld metal are deteriorated. Therefore, the B content is set to 0% to 0.0100%. It is not essential to contain B, so that the lower limit for the B content is 0%. There is no need to particularly regulate the lower limit value for the B content. However, the lower limit value therefor is 0.0001%, 0.0010%, 0.0020%, or 0.0030%. A preferable upper limit value for the B content is 0.0090%, 0.0080%, 0.0070%, or 0.0060%.

(Bi: 0% to 0.0100%)

Bi improves peeling properties of slag. Therefore, the wire according to the present embodiment may contain Bi. On the other hand, in the case where the Bi content exceeds 0.0100%, solidifying cracking is likely to be generated in a weld metal. Therefore, the Bi content is set to 0% to 0.0100%. It is not essential to contain Bi, so that the lower limit for the Bi content is 0%. There is no need to particularly regulate the lower limit value for the Bi content. However, 0.0001%, 0.0010%, 0.0020%, or 0.0030% may be set as the lower limit for the Bi content. A preferable upper limit value for the Bi content is 0.0090%, 0.0080%, 0.0070%, or 0.0060%.

(Ca: 0% to 0.0200%)

Ca fixes S by forming CaS and enhances cracking resistance properties of a weld metal. Therefore, the wire according to the present embodiment may contain Ca. On the other hand, in the case where the Ca content exceeds 0.020%, cleanliness of a weld metal is impaired and mechanical performance such as toughness is impaired. In addition, in the case where the Ca content exceeds 0.020%, a sputtering amount increases and an arc is disordered, thereby frequently generating a welding defect. Therefore, the Ca content is set to 0% to 0.020%. It is not essential to contain Ca, so that the lower limit for the Ca content is 0%. There is no need to particularly regulate the lower limit value for the Ca content. However, 0.0001%, 0.0005%, or 0.0010% may be set as the lower limit for the Bi content. A preferable upper limit value for the Ca content is 0.0160%, 0.0130%, or 0.0100%.

(REM: 0% to 0.0300%)

The term "REM" indicates 17 elements in total consisting of Sc, Y, and lanthanoid, and "the REM content" denotes the total amount of these 17 elements. In the case where lanthanoid is used as REM, REM is industrially added in a form of a Misch metal.

REM forms sulfide in a melted metal during welding and degrades the S concentration in a melted metal, thereby suppressing generation of hot-cracking. Moreover, REM contributes to refinement of a solidified structure, thereby further strengthening a weld metal. Therefore, the wire according to the present embodiment may contain REM. On the other hand, in the case where the REM content exceeds 0.0300%, a sputtering amount increases and welding workability becomes inferior. In addition, in the case where the REM content exceeds 0.0300%, a welding defect, a fine defect, and the like are generated in a weld metal due to the increased sputtering amount and the like, thereby impairing the toughness of a weld metal. Therefore, the REM content is set to 0% to 0.0300%. It is not essential to contain REM, so that the lower limit for the REM content is 0%. There is no need to particularly regulate the lower limit value for the REM content. However, 0.0001%, 0.0010%, 0.0020%, or 0.0050% may be set as the lower limit for the REM content. A preferable upper limit value for the REM content is 0.0200%, 0.0150%, or 0.0120%.

(Zr: 0% to 0.1000%)

Zr generates ZrC in a weld metal, and this ZrC causes precipitation strengthening, so that tensile strength of a weld metal is improved. Therefore, the wire according to the present embodiment may contain Zr. On the other hand, in the case where the Zr content exceeds 0.1000%, bending ductility and low temperature toughness of a weld metal are deteriorated. Therefore, the Zr content is set to 0% to 0.1000%. It is not essential to contain Zr, so that the lower limit for the Zr content is 0%. There is no need to particularly regulate the lower limit value for the Zr content. However, 0.0001%, 0.0010%, or 0.0020% may be set as the lower limit for the Zr content. A preferable upper limit value for the Zr content is 0.0900%, 0.0800%, or 0.0600%.

(Remainder: impurities)

A remainder of the wire according to the present embodiment is impurities. Impurities are compositions incorporated from a raw material, such as ore or scrap, or incorporated due to various causes in a manufacturing step when the wire is industrially manufactured. Impurities denote elements allowed within a range not adversely affecting the wire according to the present embodiment.

(Value X: 0.010% to 0.180%)

In the wire according to the present embodiment, the value X defined by the following Expression 1 needs to be set to 0.010% to 0.180%.

$$X=[Ta]+10\times[REM] \qquad \text{(Expression 1)}$$

The symbols indicated in Expression 1 are the amounts of elements by unit mass % related thereto. In the case where the REM content is 0% by unit mass %, 0 is substituted for "REM" in Expression 1. In Expression 1, the unit of the value X is mass %.

Figure 1:
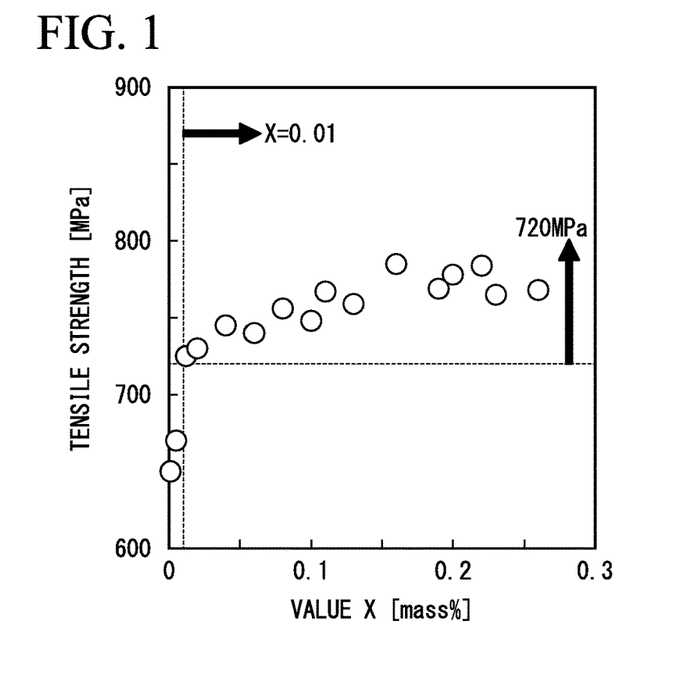
FIG. 1 is a graph showing a relationship between a value X of a Ni-based alloy wire for submerged arc welding and tensile strength of a weld metal.
Figure 2:
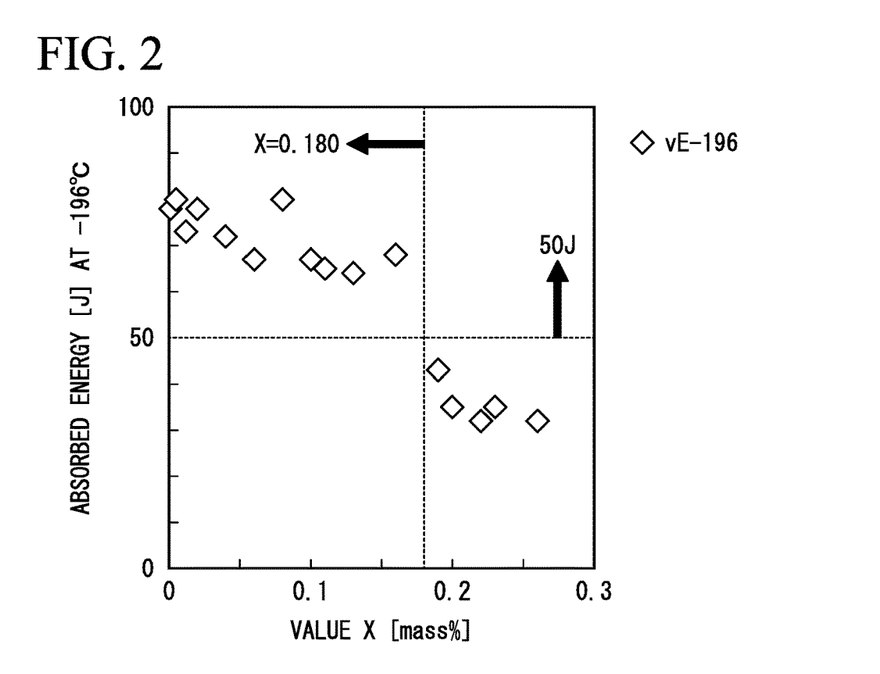
FIG. 2 is a graph showing a relationship between the value X of the Ni-based alloy wire for submerged arc welding and low temperature toughness of a weld metal.

The inventors have manufactured weld metals using various kinds of wires in which the Ta content and the REM content are varied and have investigated their tensile strength and toughness. As a result of an experiment, as shown in FIGS. 1 and 2, it has been found that in the case where the value X is less than 0.010%, tensile strength of a weld metal cannot be ensured but low temperature toughness is ensured. On the other hand, as shown in FIG. 2, it has been found that in the case where the value X exceeds 0.180%, low temperature toughness of a weld metal is degraded. That is, the inventors have found that all of high-strengthening and high toughness of a weld metal can be realized by setting the value X within a range of 0.010% to 0.180%. For the sake of hot-cracking resistance properties, it is more preferable that the lower limit value for the value X is set to 0.020%, 0.030%, 0.040%, or 0.050%. In addition, due to a similar reason, the upper limit value for the value X is 0.170%, 0.150%, 0.130%, 0.110%, or 0.100%.

The reason for the phenomenon described above occurring in accordance with the value X is presumed as follows. Ta causes precipitation strengthening by generating intermetallic compounds (a Ni—Mo—Ta based compound, and a Ni—W—Ta based compound, and the like) in a weld metal and contributes to high-strengthening of a weld metal. In addition, since Ta forms carbonitride having a high melting point, Ta suppresses hot-cracking. Since REM refines the solidified structure of a weld metal, REM contributes to high-strengthening of a weld metal. In addition, REM forms sulfide in a melted metal during welding and degrades the S concentration in a melted metal, thereby suppressing generation of hot-cracking. Therefore, it is assumed that in the case where the value X is insufficient, tensile strength of a weld metal becomes insufficient and the generation rate of hot-cracking increases. On the other hand, it is assumed that if REM is excessively contained, an arc becomes unstable, and a welding defect and a fine defect are generated in a weld metal, thereby degrading the toughness of a weld metal. However, hot-cracking can be suppressed and tensile strength can be improved even by only Ta. Therefore, as long as the regulations of the value X described above are satisfied, the amount of REM may be 0% as described above.

(Diameter: preferably 1.2 mm to 6.4 mm)

The diameter of the wire according to the present embodiment is not particularly limited and can be suitably changed in accordance with welding conditions such as a welding current. In general welding conditions which are currently used, the diameter of a wire is often set to 1.2 mm to 6.4 mm. Representative diameters of a wire include 1.6 mm, 2.4 mm, and 3.2 mm.

A method of manufacturing a wire according to the present embodiment is not particularly limited. For example, the wire according to the present embodiment can be obtained by smelting an alloy having the same chemical composition as the chemical composition of the wire according to the present embodiment described above and satisfying the regulations of the value X for the wire according to the present embodiment described above, and forging, rolling, drawing, and the like to the smelted alloy. In addition, there is no need for the chemical composition of a wire to be uniform. For example, as described above, a wire may have Cu-plating or the like on its surface. If the average chemical composition of a wire and the value X calculated therefrom are within the range described above, the wire is melted during welding and exhibits the effects described above. For example, the chemical composition of a wire can be obtained by cutting a wire into a piece having a certain length (for example, 10 cm) and performing composition analysis thereof.

Next, a method of manufacturing a welding joint according to another aspect of the present invention will be described below.

The method of manufacturing a welding joint according to the present embodiment includes submerged arc welding a steel using the Ni-based alloy wire according to the present embodiment and baked fluxes (which will hereinafter be abbreviated to "fluxes"). As a flux, in consideration of the composition of a steel (a material to be welded), mechanical properties, and the like, it is possible to suitably utilize fluxes which can be obtained on the market as fluxes for LNG storage tanks. Examples of fluxes include FS-9Ni—F and FS-9Ni—H which are fluxes regulated by JIS Z 3333:2007. Furthermore, there are NITETSU FLUX 10H of Nippon Steel & Sumikin Welding Co., Ltd., US-709S of Kobe Steel, Ltd., and OK FLUX 10.90 of ESAB. These are introduced in catalogs and the like of the makers of welding materials as baked fluxes for submerged arc welding for LNG storage tanks, and they can be easily obtained on the market. The wire used in the method of manufacturing a welding joint according to the present embodiment sufficiently includes an alloying element such as Ni for applying required mechanical properties to a weld. Therefore, regardless of the kind of a material to be welded, it is possible to manufacture a welding joint having favorable tensile strength, low temperature toughness, and the like. In the case where a steel for low temperature service, such as a steel containing Ni of 5.5%, a steel containing Ni of 6% to 7%, or a steel containing Ni of 9%, is adopted as a material to be welded, it is particularly preferable because favorable tensile strength, low temperature toughness, and the like can be applied to a welding joint in its entirety.

A particularly preferable example of the flux composition for the method of manufacturing a welding joint according to the present embodiment is as follows. Unless otherwise noted, the unit "%" regarding the flux composition denotes mass % with respect to the total mass of the flux.

($Al_2O_3$: 10% or more and less than 30%)

$Al_2O_3$ is a slag former, which appropriately ensures smoothness of weld beads, wettability of leading end portions of weld beads, and linearity of weld beads, and improves the appearance of weld beads and the shapes of weld beads. In order to reliably achieve these effects, it is preferable that the $Al_2O_3$ content is set to 10% or more. On the other hand, if the $Al_2O_3$ content is 30% or more, there is concern that the amount of oxygen in a weld metal will become excessive and impact performance at the time of a low temperature will be deteriorated. Therefore, it is preferable that the $Al_2O_3$ content is set to 10% or more and less than 30%.

(CaO: 0.1% to 15.0%)

CaO makes the familiarity of leading end portions of beads favorable, improves the appearance of beads, and prevents generation of undercuts, through adjustment of the melding point and fluidity of slag. In order to reliably achieve these effects, it is preferable that the CaO content is set to 0.1% or more. On the other hand, if the Ca content exceeds 15.0%, there is concern that the fluidity of slag will become poor, the heights of beads will become inhomogeneous, and peeling properties of slag will become poor. Therefore, it is preferable that the CaO content is set to 0.1% to 15.0%.

($SiO_2$: 0.1% to 10.0%)

$SiO_2$ appropriately ensures the viscosity of melted slag and makes the shape of weld beads favorable. In order to reliably achieve these effects, it is preferable that the $SiO_2$ content is set to 0.1% or more. On the other hand, in the case where the $SiO_2$ content exceeds 10.0%, there is concern that viscosity of melted slag will become excessive and linearity of weld beads will be degraded, so that the shapes of weld beads are deteriorated, the width of weld beads becomes narrow, and undercuts are generated. Therefore, it is preferable that the $SiO_2$ content is set to 0.1% to 10.0%.

(Metal fluoride: 20% to 50%)

Metal fluoride decreases the amount of oxygen in a weld metal and further improves the toughness of a weld metal. In addition, there are cases where metal fluoride is used for adjusting the melding point of a flux. In order to reliably achieve these effects, it is preferable that the amount of metal fluoride is set to 20% or more per total mass of fluxes. On the other hand, in the case where the amount of metal fluoride exceeds 50%, there is concern that the melding point of fluxes will be excessively low, the bead shape will become unstable, and an arc will become unstable. Therefore, it is preferable that the metal fluoride content is set to 20% to 50%. For example, metal fluoride is at least one selected from the group consisting of LiF, KF, NaF, $CaF_2$, $MgF_2$, $AlF_3$, $Na_2F$, $BaF_2$, $AlNa_3F_6$, $ZrSi_3F_6$, and $K_2F$.

(Metal carboxylate: 0.1% to 10.0%)

Metal carboxylate generates $CO_2$ gas during welding and shields a weld metal. In order to reliably achieve these effects, it is preferable that the amount of metal carboxylate is set to 0.1% or more. On the other hand, in the case where the amount of metal carboxylate exceeds 10.0%, there is concern that the arc state will become unstable and the bead shape will become poor. Therefore, it is preferable that the amount of metal carboxylate is set to 0.1% to 10.0%. For example, metal carboxylate is at least one selected from the group consisting of $CaCO_3$, $MgCO_3$, and $BaCO_3$.

(Remainder of baked flux)

A remainder of baked fluxes is oxide such as an iron oxide, and impurities. Fluxes may include metal substances (that is, metal powder formed of a single metal element, alloy powder formed of an alloy of a plurality of metal elements, and the like). Metal substances in fluxes are melted during welding and exhibit an operational effect similar to that of a metal constituting a wire.

As a steel used for manufacturing the welding joint according to the present embodiment, it is possible to use a known steel for LNG tanks, for example, SL7N590 or SL9N590 of JIS G 3127:2013, Type-1 of ASTM A553, and Grade G Class 9 or Class 10 of ASTM A841.

As welding conditions, in principle, the same conditions as those of existing welding materials disclosed in catalogs and the like of the makers of welding materials may be used. Those having sufficient experience in welding fabrication of LNG tanks can easily determine optimal welding conditions in accordance with each of the wire diameter and the welding posture through a welding test or the like performed in advance as necessary as in the case of preparing an ordinary welding fabrication instruction.

EXAMPLES

Using the baked fluxes shown in Table 1, the Ni-based alloy wires having a wire diameter of 2.4 mm shown in Tables 2-1 to 2-4, and steel plates containing Ni of 6% and having a plate thickness of 16 mm (steel plates of ASTM A841 Grade G Class 10), flat posture welding and lateral posture welding were performed in conformity with a welding test body for collecting a bending test piece of a welding joint of JIS Z 3333:2007. The welding conditions were set as disclosed in Table 3. In regard to the blowholes and the cracking rate, a radiation transmission test was performed in conformity with JIS Z 3106:2001, transmission photographs were observed, and the presence or absence of blowholes and the cracking rate were investigated. The cracking rate was set to a value obtained by dividing the total of the lengths of generated cracking by the welding length (X-tested welding length). Samples, in which blowholes or cracking was recognized, were determined as failed in welding workability. The amount of each composition in the fluxes disclosed in Table 1 was a value calculated from the value in catalogs for raw materials of fluxes, and it was assumed that the remainder was impurities. In Tables 2-1 to 2-4, the values beyond the range of the invention were underlined.

The mechanical properties of the weld metal were evaluated through the following procedure. Test pieces for a tension test, test pieces for an impact test, and test pieces for a bending test were collected from welding joints prepared in accordance with the foregoing JIS Z 3333:2007.

In the tension test, the test was performed by collecting No. A2 test piece of JIS Z 3111:2005 from the weld metal (collected such that the longitudinal direction and the welding line direction of the test piece coincide with each other), and the example related to a test piece having tensile strength of 720 MPa or more and yield strength of 435 MPa or more was determined as favorable in regard to the mechanical properties of the weld metal. In current merchandising of welding materials, although yield strength of a weld metal is not required, in consideration of the object of the present invention, it was provisionally evaluated at 435 MPa or more in the present Example.

In the impact test, No. 4 test piece of JIS Z 3111:2005 (the notch position of the test piece was at the center of the weld metal) was collected, and the impact test was performed at a test temperature of −196° C. The example related to a test piece having absorbed energy of 50 J or more was determined as favorable in regard to the low temperature toughness.

The bending test was performed as follows. A vertical-front bending test piece was collected from the weld metal in conformity with JIS Z 3122:2013. The thickness (t) of the test piece was reduced to 10 mm from the rear surface. The test piece was subjected to bending at a bending radius R of 1.0×t (that is, the bending radius R=10 mm) Thereafter, the test piece was visually evaluated. The example of the test piece in which no cracking was visually checked was determined as favorable in regard to bendability.

Including the kinds of the fluxes and the wires used in the tests, all of the test results are collectively shown in Tables 4-1 and 4-2. However, as the result of the investigation of the presence/absence of blowholes evaluated by the method described above, the presence of blowholes was not checked in all of Examples of the invention and Comparative Examples. Therefore, the test results for blowholes are omitted in Tables 4-1 and 4-2.

TABLE 1

| Flux No. | Flux composition | | | | | | | | | |
|---|---|---|---|---|---|---|---|---|---|---|
| | $Al_2O_3$ | CaO | $SiO_2$ | Metal fluoride | Metal carboxylate | Fe | C | Si | Mn | Al | Ti |
| F1 | 24.0 | 10.0 | 6.0 | 48.0 | 4.0 | 5.0 | 0.01 | 0.2 | 1.2 | 0.5 | 0.1 |
| F2 | 28.0 | 12.0 | 3.0 | 43.0 | 7.0 | 4.0 | 0.02 | 0.2 | 1.8 | 0.4 | 0.2 |
| F3 | 18.0 | 7.0 | 6.0 | 47.0 | 5.0 | 3.0 | 0.03 | 2.5 | 7.8 | 1.5 | 1.2 |
| F4 | 27.0 | 8.0 | 9.0 | 30.0 | 9.0 | 9.0 | 0.01 | 1.1 | 4.2 | 0.8 | 1.4 |
| F5 | 26.0 | 3.0 | 7.0 | 43.0 | 8.0 | 10.0 | 0.30 | 0.3 | 1.4 | 0.7 | 0.1 |

TABLE 2-1

| | Wire No. | Wire composition | | | | | | | | | | | | | |
|---|---|---|---|---|---|---|---|---|---|---|---|---|---|---|---|
| | | C | Si | Mn | Mo | W | Ta | Ni | Al | Ti | Al + Ti | Cu | P | S | N | O |
| Examples of invention | Y1 | 0.005 | 0.54 | 0.03 | 20.1 | 4.6 | 0.080 | 73.0 | 0.40 | 0.50 | 0.90 | 0.4 | 0.0094 | 0.0100 | 0.0523 | 0.0082 |
| | Y2 | 0.055 | 0.08 | 5.50 | 15.5 | 2.8 | 0.040 | 66.2 | | 0.07 | 0.07 | | 0.0086 | 0.0120 | 0.0564 | 0.0018 |
| | Y3 | 0.022 | 0.02 | 0.13 | 19.4 | 5.4 | 0.003 | 70.1 | 0.20 | 0.05 | 0.25 | 0.9 | 0.0028 | 0.0001 | 0.0185 | 0.0037 |
| | Y4 | 0.032 | 2.80 | 0.83 | 16.9 | 6.6 | 0.095 | 66.4 | 0.07 | | 0.07 | | 0.0046 | 0.0190 | 0.0147 | 0.0059 |
| | Y5 | 0.017 | 0.05 | 0.19 | 16.0 | 3.1 | 0.051 | 78.1 | 1.95 | | 1.95 | | 0.0001 | 0.0070 | 0.0800 | 0.0040 |
| | Y6 | 0.014 | 0.05 | 0.06 | 24.0 | 3.2 | 0.057 | 67.8 | 0.02 | 0.06 | 0.08 | 0.5 | 0.0190 | 0.0100 | 0.0001 | 0.0035 |
| | Y7 | 0.045 | 0.32 | 1.35 | 21.3 | 2.6 | 0.053 | 68.2 | | 0.06 | 0.06 | 0.3 | 0.0064 | 0.0026 | 0.0105 | 0.0070 |
| | Y8 | 0.037 | 0.32 | 1.10 | 16.7 | 9.0 | 0.008 | 67.7 | 1.20 | 1.94 | 3.14 | 0.4 | 0.0050 | 0.0192 | 0.0613 | 0.0043 |
| | Y9 | 0.023 | 0.45 | 0.87 | 18.4 | 3.4 | 0.025 | 67.3 | 0.03 | | 0.03 | 0.5 | 0.0141 | 0.0106 | 0.0435 | 0.0017 |
| | Y10 | 0.029 | 0.84 | 0.71 | 17.1 | 4.7 | 0.022 | 68.8 | 1.85 | 1.80 | 3.65 | 0.8 | 0.0087 | 0.0025 | 0.0405 | 0.0078 |
| | Y11 | 0.042 | 0.81 | 2.40 | 18.0 | 2.7 | 0.063 | 65.7 | 0.06 | | 0.06 | 0.4 | 0.0095 | 0.0125 | 0.0445 | 0.0001 |
| | Y12 | 0.038 | 0.88 | 0.46 | 20.0 | 6.2 | 0.019 | 66.2 | | 0.08 | 0.08 | | 0.0090 | 0.0025 | 0.0315 | 0.0095 |
| | Y13 | 0.035 | 1.22 | 2.99 | 17.2 | 5.5 | 0.075 | 66.8 | 1.20 | 0.10 | 1.30 | 0.5 | 0.0180 | 0.0197 | 0.0783 | 0.0064 |
| | Y14 | 0.036 | 0.65 | 2.56 | 19.6 | 3.5 | 0.002 | 65.6 | 0.08 | 0.06 | 0.14 | 0.4 | 0.0138 | 0.0036 | 0.0203 | 0.0026 |
| | Y15 | 0.031 | 0.45 | 3.41 | 20.5 | 5.5 | 0.065 | 70.0 | | | | | 0.0138 | 0.0036 | 0.0203 | 0.0026 |
| | Y16 | 0.054 | 0.65 | 2.85 | 18.4 | 4.8 | 0.074 | 72.8 | 0.22 | 0.08 | 0.30 | | 0.0138 | 0.0036 | 0.0203 | 0.0026 |

TABLE 2-2

| | Wire No. | Wire composition | | | | | | | | | | |
|---|---|---|---|---|---|---|---|---|---|---|---|---|
| | | Fe | Co | Cr | V | Nb | B | Bi | Ca | REM | Zr | Value X |
| Examples of invention | Y1 | | 0.0809 | 0.0095 | 0.0797 | 0.0487 | | | 0.0024 | 0.0085 | 0.0267 | 0.165 |
| | Y2 | 9.5000 | 0.0399 | 0.0556 | 0.0461 | 0.0097 | 0.0033 | 0.0080 | 0.0122 | 0.0094 | 0.0073 | 0.134 |
| | Y3 | 3.2001 | | 0.4301 | 0.0309 | | | 0.0071 | 0.0084 | 0.0066 | 0.0793 | 0.069 |
| | Y4 | 5.2801 | 0.0955 | 0.5492 | 0.0835 | 0.0900 | 0.0031 | 0.0070 | 0.0079 | | 0.0875 | 0.095 |
| | Y5 | 0.3000 | 0.0345 | | 0.0151 | 0.0149 | 0.0030 | 0.0067 | 0.0195 | 0.0120 | 0.0359 | 0.171 |
| | Y6 | 3.2000 | 0.0685 | 0.9000 | 0.0031 | 0.0083 | 0.0082 | 0.0066 | 0.0052 | 0.0114 | 0.0447 | 0.170 |
| | Y7 | 5.3000 | 0.0339 | 0.2931 | 0.0189 | 0.0279 | 0.0034 | 0.0086 | 0.0139 | | 0.0427 | 0.053 |
| | Y8 | 0.8500 | 0.0907 | 0.5234 | 0.0073 | 0.0031 | 0.0017 | 0.0066 | 0.0016 | 0.0165 | 0.0463 | 0.173 |
| | Y9 | 7.8001 | | 0.9620 | 0.0047 | 0.0343 | | 0.0051 | 0.0182 | 0.0142 | 0.0679 | 0.167 |
| | Y10 | 2.1000 | 0.0950 | 0.9126 | 0.0133 | 0.0543 | 0.0090 | 0.0081 | 0.0176 | | 0.0429 | 0.022 |
| | Y11 | 9.4801 | 0.0659 | 0.1803 | | 0.0335 | 0.0049 | 0.0091 | | 0.0084 | 0.0025 | 0.147 |
| | Y12 | 5.3601 | 0.0213 | 0.4112 | 0.0900 | 0.0865 | 0.0075 | 0.0054 | 0.0180 | 0.0114 | 0.0585 | 0.133 |
| | Y13 | 3.9601 | 0.0775 | 0.1182 | 0.0929 | 0.0247 | 0.0073 | 0.0022 | 0.0146 | | | 0.075 |
| | Y14 | 6.5601 | 0.0671 | 0.6331 | 0.0161 | 0.0287 | 0.0082 | 0.0100 | 0.0120 | 0.0178 | 0.0900 | 0.180 |
| | Y15 | | | | | | | | | | | 0.065 |
| | Y16 | | | | | | | | | | | 0.074 |

TABLE 2-3

| Wire No. | | C | Si | Mn | Mo | W | Ta | Ni | Al | Ti | Al + Ti | Cu | P | S | N | O |
|---|---|---|---|---|---|---|---|---|---|---|---|---|---|---|---|---|
| Comparative Examples | Z1 | 0.041 | 1.28 | 0.08 | 23.2 | 4.8 | 0.001 | 70.4 | 0.04 | | 0.04 | | 0.0150 | 0.0110 | 0.0783 | 0.0017 |
| | Z2 | 0.039 | 0.86 | 0.15 | 18.4 | 5.8 | 0.150 | 74.5 | | 0.03 | 0.03 | | 0.0090 | 0.0070 | 0.0375 | 0.0094 |
| | Z3 | 0.033 | 1.25 | 0.65 | 21.5 | 6.9 | 0.005 | 69.5 | | 0.05 | 0.05 | | 0.0060 | 0.0080 | 0.0230 | 0.0035 |
| | Z4 | 0.025 | 2.14 | 0.74 | 17.4 | 7.4 | 0.070 | 72.1 | 0.04 | | 0.04 | | 0.0050 | 0.0140 | 0.0740 | 0.0037 |
| | Z5 | 0.022 | 0.08 | 0.46 | 15.6 | 2.8 | 0.007 | 81.0 | | 0.02 | 0.02 | | 0.0120 | 0.0080 | | |
| | Z6 | 0.035 | 0.53 | 1.34 | 15.8 | 3.1 | 0.004 | 78.9 | 0.02 | | 0.02 | | 0.0070 | 0.0110 | 0.0030 | 0.0050 |
| | Z7 | 0.026 | 0.37 | 3.51 | 21.4 | 5.7 | 0.003 | 68.7 | | 0.02 | 0.02 | 0.2 | 0.0150 | 0.0090 | 0.0100 | |
| | Z8 | 0.042 | 1.34 | 0.49 | 18.6 | 8.5 | 0.095 | 70.9 | 0.02 | | 0.02 | | 0.0110 | 0.0070 | | 0.0036 |

TABLE 2-4

| Wire No. | | Fe | Co | Cr | V | Nb | B | Bi | Ca | REM | Zr | Value X |
|---|---|---|---|---|---|---|---|---|---|---|---|---|
| Comparative Examples | Z1 | | | | | | | 0.0080 | | 0.0040 | | 0.041 |
| | Z2 | | | | | | | | | | | 0.150 |
| | Z3 | | 0.0800 | | | | | | 0.0080 | | | 0.005 |
| | Z4 | | | | | | | | | 0.0120 | | 0.190 |
| | Z5 | | | | | | | | | | | 0.007 |
| | Z6 | | | 0.2000 | | | | | | 0.0005 | | 0.009 |
| | Z7 | | | | 0.0500 | | | | | 0.0190 | | 0.193 |
| | Z8 | | | | | | | | | 0.0100 | | 0.195 |

TABLE 3

| Welding current [A] | Welding voltage [V] | Welding rate [cm/min] | Preheating [° C.] | Temperature between passes [° C.] |
|---|---|---|---|---|
| 300 to 400 | 30 to 40 | 30 | Absent | 150° C. or less |

TABLE 4-1

| | No. | Flux No. | Wire No. | Cracking rate [%] | Bead shape | Yield strength [MPa] | Tensile strength [MPa] | Absorbed energy at −196° C. [J] | Bending test | General evaluation |
|---|---|---|---|---|---|---|---|---|---|---|
| Examples of invention | A1 | F1 | Y1 | 0 | favorable | 445 | 785 | 75 | passed | passed |
| | A2 | F2 | Y2 | 0 | favorable | 439 | 752 | 105 | passed | passed |
| | A3 | F3 | Y3 | 0 | favorable | 461 | 771 | 82 | passed | passed |
| | A4 | F4 | Y4 | 0 | favorable | 450 | 775 | 86 | passed | passed |
| | A5 | F5 | Y5 | 0 | favorable | 444 | 758 | 95 | passed | passed |
| | A6 | F2 | Y6 | 0 | favorable | 462 | 755 | 106 | passed | passed |
| | A7 | F3 | Y7 | 0 | favorable | 446 | 762 | 97 | passed | passed |
| | A8 | F1 | Y8 | 0 | favorable | 448 | 770 | 75 | passed | passed |
| | A9 | F4 | Y9 | 0 | favorable | 453 | 782 | 78 | passed | passed |
| | A10 | F3 | Y10 | 0 | favorable | 455 | 769 | 83 | passed | passed |
| | A11 | F2 | Y11 | 0 | favorable | 464 | 776 | 96 | passed | passed |
| | A12 | F4 | Y12 | 0 | favorable | 460 | 762 | 99 | passed | passed |
| | A13 | F3 | Y13 | 0 | favorable | 459 | 773 | 74 | passed | passed |
| | A14 | F2 | Y14 | 0 | favorable | 447 | 768 | 84 | passed | passed |
| | A15 | F3 | Y15 | 0 | favorable | 441 | 764 | 75 | passed | passed |
| | A16 | F2 | Y16 | 0 | favorable | 465 | 771 | 82 | passed | passed |

TABLE 4-2

|  | No. | Flux No. | Wire No. | Cracking rate [%] | Bead shape | Yield strength [MPa] | Tensile strength [MPa] | Absorbed energy at −196° C. [J] | Bending test | General evaluation |
|---|---|---|---|---|---|---|---|---|---|---|
| Comparative Example | B1 | F5 | Z1 | 60 | favorable | 421 | 661 | 78 | passed | failed |
|  | B2 | F5 | Z2 | 0 | favorable | 454 | 796 | 30 | failed | failed |
|  | B3 | F4 | Z3 | 0 | favorable | 414 | 704 | 78 | passed | failed |
|  | B4 | F4 | Z4 | 0 | poor | 430 | 756 | 25 | passed | failed |
|  | B5 | F2 | Z5 | 0 | favorable | 410 | 701 | 65 | passed | failed |
|  | B6 | F1 | Z6 | 30 | favorable | 418 | 695 | 52 | failed | failed |
|  | B7 | F3 | Z7 | 0 | poor | 435 | 736 | 34 | failed | failed |
|  | B8 | F3 | Z8 | 0 | favorable | 428 | 754 | 30 | failed | failed |

The wires Nos. Y1 to Y16 satisfied all of the requirements of the present invention indicated favorable properties in the test. That is, as the result of welding using the wires Nos. Y1 to Y16, blowholes and cracking was not generated in the weld metal. The bead shape was favorable, and the mechanical properties of the weld metal were also favorable.

On the other hand, in the wires No. Z1 to Z19 of Comparative Examples which did not satisfied at least one of the requirements of the present invention, the following problems were caused.

In No. Z1, Ta became insufficient. Therefore, in welding in which No. Z1 was used, cracking was generated, and yield strength and tensile strength became insufficient.

In No. Z2, Ta was excessive. Therefore, in welding in which No. Z2 was used, low temperature toughness and bending ductility became insufficient.

In Nos. Z3, Z5, and Z6, the value X became insufficient. Therefore, in welding in which these were used, yield strength and tensile strength became insufficient. Moreover, in No. Z6, cracking was generated in the weld metal, and bending ductility was also insufficient.

In Nos. Z4, Z7, and Z8, the value X was excessive. Therefore, in welding in which these were used, low temperature toughness became insufficient. Moreover, in No. Z4, insufficient yield strength and a poor bead shape were caused. In No. Z7, a poor bead shape and insufficient bending ductility were caused. In No. Z8, insufficient yield strength and insufficient bending ductility were caused.

The invention claimed is:

1. A Ni-based alloy wire for submerged arc welding comprising, as a chemical composition, by mass %:
   C: 0.001% to 0.060%;
   Si: 0.01% to 3.00%;
   Mn: 0.01% to 6.00%;
   Mo: 15.0% to 25.0%;
   W: 2.5% to 10.0%;
   Ta: 0.002% to 0.100%;
   Ni: 65.0% to 82.4%;
   Al: 0% to 2.00%;
   Ti: 0% to 2.00%;
   Cu: 0% to 1.0%;
   P: 0.0200% or less;
   S: 0.0200% or less;
   N: 0% to 0.1000%;
   O: 0% to 0.0100%;
   Fe: 0% to 10.0000%;
   Co: 0% to 0.1000%;
   Cr: 0% to 1.0000%;
   V: 0% to 0.1000%;
   Nb: 0% to 0.1000%;
   B: 0% to 0.0100%;
   Bi: 0% to 0.0100%;
   Ca: 0% to 0.0200%;
   REM: 0% to 0.0300%;
   Zr: 0% to 0.1000%; and
   a remainder: impurities,
   wherein a value X defined by following Expression 1 is 0.010% to 0.180%, $$X=[\text{Ta}]+10\times[\text{REM}] \quad \text{(Expression 1)}$$

where, symbols indicated in the Expression 1 are amounts of corresponding elements by mass %.

2. The Ni-based alloy wire for submerged arc welding according to claim 1,
   wherein the value X is 0.020% to 0.150%.

3. The Ni-based alloy wire for submerged arc welding according to claim 1,
   wherein a total value of an Al content and a Ti content is 0.01% to 4.00% by mass %.

4. The Ni-based alloy wire for submerged arc welding according to claim 1,
   wherein a diameter of the wire is 1.2 mm to 6.4 mm.

5. A method of manufacturing a welding joint, comprising:
   submerged arc welding a steel using the Ni-based alloy wire according to claim 1 and a baked flux.

6. The Ni-based alloy wire for submerged arc welding according to claim 2,
   wherein a total value of an Al content and a Ti content is 0.01% to 4.00% by mass %.

7. The Ni-based alloy wire for submerged arc welding according to claim 2,
   wherein a diameter of the wire is 1.2 mm to 6.4 mm.

8. The Ni-based alloy wire for submerged arc welding according to claim 3,
   wherein a diameter of the wire is 1.2 mm to 6.4 mm.

9. The Ni-based alloy wire for submerged arc welding according to claim 6,
   wherein a diameter of the wire is 1.2 mm to 6.4 mm.

10. A method of manufacturing a welding joint, comprising:
    submerged arc welding a steel using the Ni-based alloy wire according to claim 2 and a baked flux.

11. A method of manufacturing a welding joint, comprising:
    submerged arc welding a steel using the Ni-based alloy wire according to claim 3 and a baked flux.

12. A method of manufacturing a welding joint, comprising:
    submerged arc welding a steel using the Ni-based alloy wire according to claim 4 and a baked flux.

13. A method of manufacturing a welding joint, comprising:
   submerged arc welding a steel using the Ni-based alloy wire according to claim 6 and a baked flux.

14. A method of manufacturing a welding joint, comprising:
   submerged arc welding a steel using the Ni-based alloy wire according to claim 7 and a baked flux.

15. A method of manufacturing a welding joint, comprising:
   submerged arc welding a steel using the Ni-based alloy wire according to claim 8 and a baked flux.

16. A method of manufacturing a welding joint, comprising:
   submerged arc welding a steel using the Ni-based alloy wire according to claim 9 and a baked flux.

* * * * *